United States Patent
Taira et al.

(10) Patent No.: US 7,679,635 B2
(45) Date of Patent: Mar. 16, 2010

(54) IMAGE FORMING APPARATUS, EXPOSURE APPARATUS AND IMAGE FORMING METHOD

(75) Inventors: Yoshihiko Taira, Ebina (JP); Youji Houki, Ebina (JP); Yukihiro Matsushita, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 31 days.

(21) Appl. No.: 12/015,074

(22) Filed: Jan. 16, 2008

(65) Prior Publication Data
US 2008/0232844 A1 Sep. 25, 2008

(30) Foreign Application Priority Data
Mar. 14, 2007 (JP) ............................... 2007-065566

(51) Int. Cl.
*B41J 15/14* (2006.01)
*B41J 27/00* (2006.01)
(52) U.S. Cl. ...................... 347/241; 347/256
(58) Field of Classification Search ................. 347/133, 347/234, 238, 241, 256; 399/44, 336
See application file for complete search history.

(56) References Cited

U.S. PATENT DOCUMENTS

| 5,784,666 | A | * | 7/1998 | Nagase et al. .................. 399/44 |
| 6,266,074 | B1 | * | 7/2001 | Koumura et al. ............ 347/133 |
| 7,256,811 | B2 | * | 8/2007 | To et al. ...................... 347/234 |
| 7,430,395 | B2 | * | 9/2008 | Iwaishi et al. ................ 399/336 |

FOREIGN PATENT DOCUMENTS

JP 10016293 A * 1/1998
JP 2002-370400 A 12/2002

* cited by examiner

*Primary Examiner*—Hai C Pham
(74) *Attorney, Agent, or Firm*—Sughrue Mion, PLLC

(57) ABSTRACT

The image forming apparatus is provided with: plural image carriers; and plural exposure apparatuses that are arranged corresponding to the plural image carriers respectively. The exposure apparatus has a light emitting element member that exposes the image carrier and is arranged on a substrate. A predetermined exposure apparatus among the plural exposure apparatuses includes a heating unit that heats the substrate, and other exposure apparatus other than the predetermined exposure apparatus does not include the heating unit.

11 Claims, 10 Drawing Sheets

IMAGE FORMING APPARATUS, EXPOSURE APPARATUS AND IMAGE FORMING METHOD

CROSS REFERENCE TO RELATED APPLICATIONS

This application is based on and claims priority under 35 USC §119 from Japanese Patent Application No. 2007-065566 filed Mar. 14, 2007.

BACKGROUND

1. Technical Field

The present invention relates to an image forming apparatus and the like such as a printer and a copy machine, an exposure apparatus and an image forming method.

2. Related Art

In a color image forming apparatus with an electrophotographic type such as a printer and a copy machine, as an exposure apparatus that is used at the time of forming color toner images, there is a known apparatus that is formed by arranging light emitting elements such as LED in the main scanning direction. In such an exposure apparatus, since heat is generated at the time of lighting the light emitting elements, a substrate that supports the light emitting elements elongates and retracts due to an influence of the heat. Therefore, different displacement of the light emitting elements is generated for each exposure apparatus. When the color toner images are combined, there is sometimes a case where color drift is generated.

SUMMARY

According to an aspect of the invention, there is provided an image forming apparatus including: plural image carriers; and plural exposure apparatuses that are arranged corresponding to the plural image carriers respectively. The exposure apparatus has a light emitting element member that exposes the image carrier and is arranged on a substrate. A predetermined exposure apparatus among the plural exposure apparatuses includes a heating unit that heats the substrate, and other exposure apparatus other than the predetermined exposure apparatus does not include the heating unit.

BRIEF DESCRIPTION OF THE DRAWINGS

Exemplary embodiment(s) of the present invention will be described in detail based on the following figures, wherein.

DETAILED DESCRIPTION

Hereinafter, with reference to the attached drawings, a detailed description is given to exemplary embodiments of the present invention.

First Exemplary Embodiment

Figure 1:
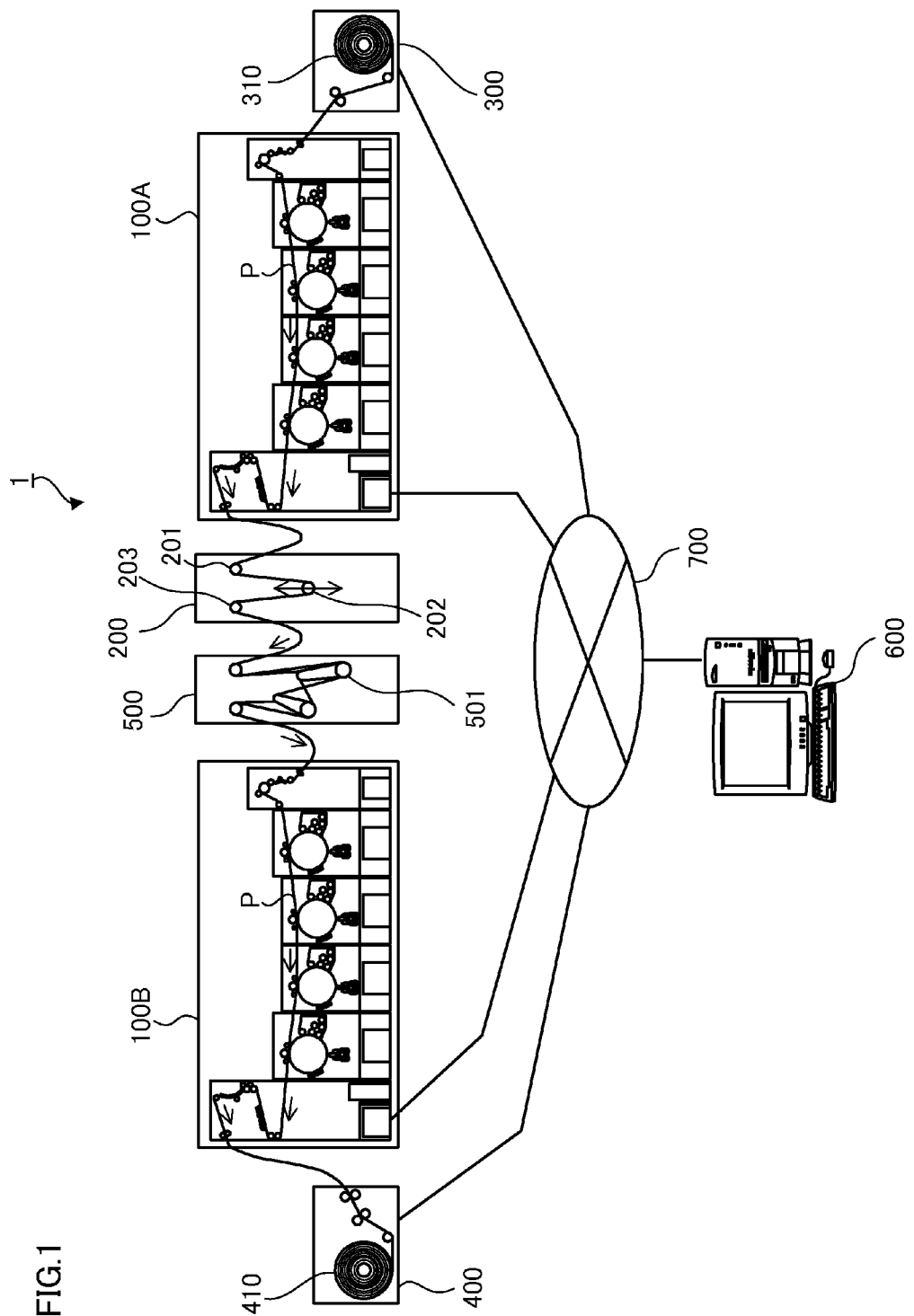
FIG. 1 is a view that shows an entire configuration of a printing system to which an image forming apparatus according to the first exemplary embodiment is applied.

FIG. 1 is a view that shows an entire configuration of a printing system 1 to which an image forming apparatus according to the first exemplary embodiment is applied. The printing system 1 shown in FIG. 1 is configured so as to use a continuous paper P that is continuously formed in a belt shape as an example of a recording medium, and form an image on the both sides of the continuous paper P. That is, the printing system 1 according to the first exemplary embodiment is provided with, from the upstream side in the transportation direction of the continuous paper P towards the downstream side, a continuous paper supplying apparatus 300, a first printer 100A serving as an example of the image forming apparatus that is arranged on the upstream side, a buffer unit 200, a front-back reverse unit 500, a second printer 100B serving as an example of the image forming apparatus that is arranged on the downstream side, and a continuous paper winding apparatus 400.

The printing system 1 according to the first exemplary embodiment is provided with a control computer 600 that controls actions of the apparatuses configuring the printing system 1. The control computer 600 is connected to the continuous paper supplying apparatus 300, the first printer 100A, the second printer 100B, and the continuous paper winding apparatus 400 through a communication network 700.

In the continuous paper supplying apparatus 300, a continuous paper roll 310 around which the continuous paper P is wound, is installed so as to supply the continuous paper P to the first printer 100A.

The first printer 100A prints an image on a front surface of the continuous paper P that is supplied from the continuous paper supplying apparatus 300 on the basis of image data that is sent from the control computer 600.

The buffer unit 200 transports the continuous paper P of which, in the first printer 100A, a printing processing is performed on the front surface side towards the second printer 100B, while holding a predetermined amount of the continuous paper P. That is, in the buffer unit 200, as a transporting roll, an upstream side hanging roll 201, a tension roll 202 that is installed movably in, for example, the up and down direction (the arrow direction), and transports the continuous paper P while giving a predetermined tensile force to the continuous paper P, and a downstream side hanging roll 203 are arranged. The continuous paper P is successively transported from the upstream side hanging roll 201 to the downstream side hanging roll 203 through the tension roll 202 (201→202→203). As a result, a loop that is to hold a predetermined amount of the continuous paper P within the buffer unit 200 is formed in the continuous paper P. Such a loop of the continuous paper P is formed, and the tension roll 202 is moved in the up and down direction corresponding to a change in the tensile force of the continuous paper P so that a big change in the tensile force of the continuous paper P is suppressed. Thereby, between the first printer 100A and the second printer 100B, tear of the continuous paper P caused by the excessively increased tensile force of the continuous paper P, or displacement in the transportation direction of the continuous paper P and wrinkles in the continuous paper P caused by looseness of the continuous paper P is suppressed.

The front-back reverse unit 500 reverses the front and the back surfaces of the continuous paper P and supplies the continuous paper P to the second printer 100B. That is, in the front-back reverse unit 500, a front-back reverse roll 501 that is arranged with inclination of 45 degrees in the transportation direction of the continuous paper P is provided. By transporting the continuous paper P while hanging the continuous paper P with the front-back reverse roll 501, the front and the back surfaces of the continuous paper P is reversed. Therefore, the transportation direction of the continuous paper P that already passes through the front-back reverse unit 500 is changed by 90 degrees. Consequently, the second printer 100B is arranged in the direction with 90 degrees displacement from the first printer 100A.

The second printer 100B is configured similarly to the first printer 100A. On a back surface of the continuous paper P of which, in the first printer 100A, the printing processing has been performed on the front surface, the image is printed on the basis of the image data that is sent from the control computer 600.

The continuous paper winding apparatus 400 winds the continuous paper P of which, in the second printer 100B, the printing processing has been performed on the back surface around a winding roll 410.

It should be noted that in the printing system 1 according to the first exemplary embodiment, the first printer 100A forms the image on the front surface of the continuous paper P, and the second printer 100B forms the image on the back surface of the continuous paper P, respectively. However, the printing system 1 may be configured such that the first printer 100A forms the image on the back surface of the continuous paper P and the second printer 100B forms the image on the front surface of the continuous paper P respectively.

The control computer 600 outputs the image data to be printed on the front surface side and the image data to be printed on the back surface side at predetermined timing to the first printer 100A and the second printer 100B respectively through the communication network 700. Moreover, the control computer 600 outputs control signals that control actions of the first printer 100A and the second printer 100B respectively.

The communication network 700 is configured so as to communicate interactively by using a communication line and a cable, or may be configured by, for example, a network such as LAN (Local Area Network), WAN (Wide Area Network) and the like.

In the printing system 1 according to the first exemplary embodiment, under the control of the control computer 600, the first printer 100A prints a full color image on the front surface side of the continuous paper P that is supplied from the continuous paper supplying apparatus 300. The continuous paper P of which, in the first printer 100A, the full color image is printed on the front surface side is transported to the buffer unit 200, and while a predetermined amount of the continuous paper P is held in the buffer unit 200, the continuous paper P is transported to the front-back reverse unit 500. The front-back reverse unit 500 reverses the front and the back surfaces of the transported continuous paper P and transports the continuous paper P to the second printer 100B.

In the second printer 100B to which the reversed continuous paper P is transported, the full color image is printed on the back surface side of the continuous paper P. while the page thereof is aligned with the image that is printed on the front surface side in the first printer 100A. Thereby, the full color images are formed on the both sides of the continuous paper P. The continuous paper P on which the printing processing has been performed in the second printer 100B is fed to the continuous paper winding apparatus 400 and wound around the winding roll 410.

Next, a description is given to the first printer 100A and the second printer 100B according to the first exemplary embodiment. In the first exemplary embodiment, the first printer 100A and the second printer 100B have the same configuration each other.

Figure 2:
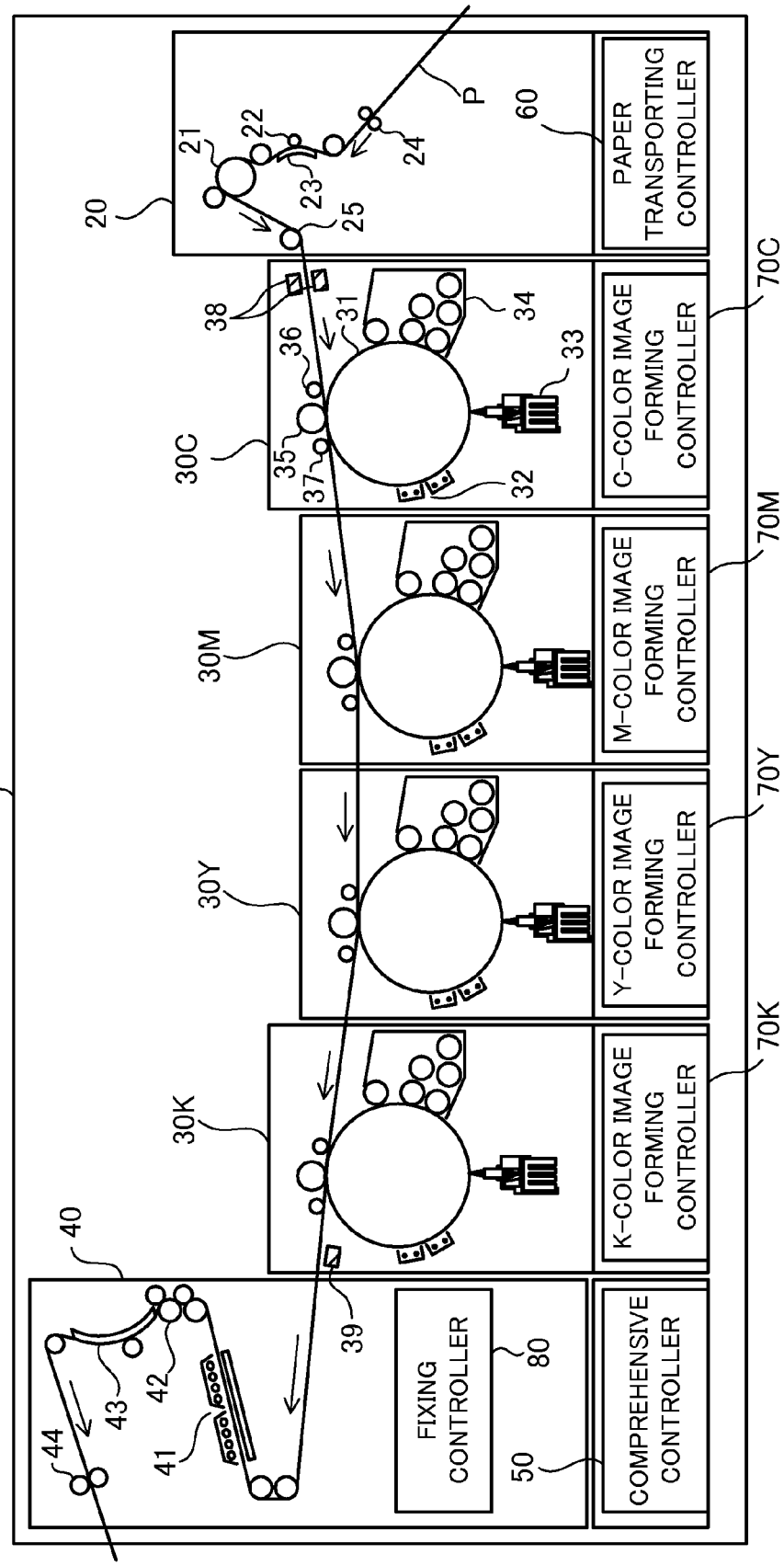
FIG. 2 is a view that shows a configuration of the first printer and the second printer according to the first exemplary embodiment.

FIG. 2 is a view that shows a configuration of the first printer 100A and the second printer 100B according to the first exemplary embodiment (hereinafter, simply referred to as a "printer 100"). The printer 100 shown in FIG. 2 is an image forming apparatus with, for example, an electrophotographic type. The printer 100 is provided with, from the upstream side in the transportation direction (an arrow in the figure) of the continuous paper P towards the downstream side, a paper transporting unit 20 that transports and drives the continuous paper P, and four image forming units, that is, a C-color image forming unit 30C that forms a toner image of cyan (C), a M-color image forming unit 30M that forms a toner image of magenta (M), a Y-color image forming unit 30Y that forms a toner image of yellow (Y), and a K-color image forming unit 30K that forms a toner image of black (K) on the continuous paper P. On the most downstream part, a fixing unit 40 that fixes the color toner images is provided.

In the paper transporting unit 20, from the upstream side to the downstream side in the transportation direction of the continuous paper P, aback tension rolls 24, an aligning roll 22, a main drive roll 21 and a paper transportation direction changing roll 25 are arranged.

The main drive roll 21 has a function of nipping the continuous paper P with a predetermined pressure, receiving drive from a main motor (not shown in the figure) that is arranged in the paper transporting unit 20, and feeding the continuous paper P at a predetermined transportation speed. The aligning roll 22 has a function of cooperating with a guiding member 23 which is in a partially cylindrical shape, and constantly keeping a transportation route of the continuous paper P on the upstream side of the main drive roll 21. The back tension rolls 24 have a function of rotating at a lower speed than that of the main drive roll 21 and giving the tensile force to the continuous paper P on the upstream side of the main drive roll 21. The paper transportation direction changing roll 25 is a driven roll that is driven by winding and hanging the continuous paper P and has a function of changing the transportation direction of the continuous paper P that is fed from the main drive roll 21 to the direction towards the K-color image forming unit 30K.

Each of the C-color image forming unit 30C, the M-color image forming unit 30M, the Y-color image forming unit 30Y, and the K-color image forming unit 30K (hereinafter, also collectively referred to as an "image forming unit 30") is provided with a photoconductor drum 31 serving as an image carrier, an electrically charging device 32 that electrically charges a surface of the photoconductor drum 31 at a predetermined potential, a LED printhead (LPH) 33 serving as an example of an exposure apparatus that exposes the surface of the photoconductor drum 31 on the basis of the image data, a developing device 34 that develops an electrostatic latent image formed on the surface of the photoconductor drum 31 by each of the color toners, a transfer device 35 that transfers the toner image formed on the surface of the photoconductor drum 31 to the continuous paper P, and a pair of transfer guiding rolls 36 and 37 that are arranged on the upstream side and the downstream side of the transfer device 35 respectively, and press the continuous paper P onto the photoconductor drum 31.

Further, the C-color image forming unit 30C is provided with a page resist mark reading unit 38 that reads a page resist mark (described later) for aligning the pages formed on any one of the front surface and the back surface of the continuous paper P or on both the front surface and the back surface, and outputs a timing signal. The K-color image forming unit 30K is provided with a color resist mark reading unit 39 that reads a color resist mark (described later) for aligning the color images formed on the surface of the continuous paper P, and outputs the timing signal and reading position data.

The fixing unit 40 is provided with a flush fixing device 41 that fixes the color toner images formed on the continuous paper P to the continuous paper P by a luminous body such as a flush lump in a non-contact state, tensile force giving roll members 42 that give the tensile force to the continuous paper P on the downstream side of the flush fixing device 41, an aligning member 43 that corrects the route of the continuous paper P in the width direction on the downstream side of the tensile force giving roll members 42, and tension rolls 44 that nip the continuous paper P in the vicinity of an outlet, rotate at a higher speed than the transportation speed of the continuous paper P, and gives the tensile force to the continuous paper P.

Further, the printer 100 is provided with a comprehensive controller 50 that controls an entire action of the printer 100, a paper transporting controller 60 that controls the paper transporting unit 20, a C-color image forming controller 70C that controls an action of the C-color image forming unit 30C, a M-color image forming controller 70M that controls an action of the M-color image forming unit 30M, a Y-color image forming controller 70Y that controls an action of the Y-color image forming unit 30Y, a K-color image forming controller 70K that controls an action of the K-color image forming unit 30K, and a fixing controller 80 that controls an action of the fixing unit 40.

The paper transporting controller 60, the C-color image forming controller 70C, the M-color image forming controller 70M, the Y-color image forming controller 70Y, the K-color image forming controller 70K, and the fixing controller 80 are comprehensively controlled by the comprehensive controller 50.

In the printing system 1 according to the first exemplary embodiment, when the printing system 1 is started, the image data for the front surface side and the image data for the back surface side are inputted from the control computer 600 to each of the comprehensive controllers 50 of corresponding one of the printers 100 through the communication network 700. The comprehensive controller 50 divides the inputted image data into image data respectively corresponding to the C-color, the M-color, the Y-color and the K-color, and sends the C-color image data, the M-color image data, the Y-color image data, and the K-color image data to the C-color image forming controller 70C, the M-color image forming controller 70M, the Y-color image forming controller 70Y, and the K-color image forming controller 70K respectively.

In synchronization with the inputting of the image data to the comprehensive controller 50, the comprehensive controller 50 controls the paper transporting unit 20 through the paper transporting controller 60 and further controls the fixing unit 40 through the fixing controller 80 so as to transport the continuous paper P at a predetermined transportation speed while giving a predetermined tensile force to the continuous paper P.

Under the control of the comprehensive controller 50, the C-color image forming controller 70C, the M-color image forming controller 70M, the Y-color image forming controller 70Y, and the K-color image forming controller 70K (hereinafter, collectively referred to as a "color image forming controller 70") control formation of each of the color toner images in corresponding one of the color image forming units 30.

That is, in the color image forming units 30, under the control of the color image forming controller 70, the photoconductor drum 31 starts rotation, and the surface of the photoconductor drum 31 is electrically charged by the electrically charging device 32 at a predetermined potential (for example, −500V). Further, by exposure by the LPH 33 that emits light on the basis of the color image data, the electrostatic latent image is formed. The electrostatic latent image on the photoconductor drum 31 is developed by the developing device 34 with the color toners to form the color toner image. The color toner image formed on the surface of the photoconductor drum 31 is transferred to the continuous paper P by the transfer device 35 and the transfer guiding rolls 36 and 37.

The continuous paper P is successively transported from the C-color image forming unit 30C to the K-color image forming unit 30K through the M-color image forming unit 30M and the Y-color image forming unit 30Y (30C→30M→30Y→30K). Thereby, the color toner images are superimposed with each other, and a full color toner image is formed on the continuous paper P.

After that, the continuous paper P on which the full color toner image is formed is transported to the fixing unit 40, and the toner image is fixed to the continuous paper P by the flush fixing device 41. Thereby, in the first printer 100A, the full color image is formed on the front surface side of the continuous paper P. In the same way, in the second printer 100B, the full color image is formed on the back surface side of the continuous paper P.

Subsequently, a description is given to the LED printhead (LPH) 33 that is provided in the first printer 100A and the second printer 100B according to the first exemplary embodiment.

Figure 3:
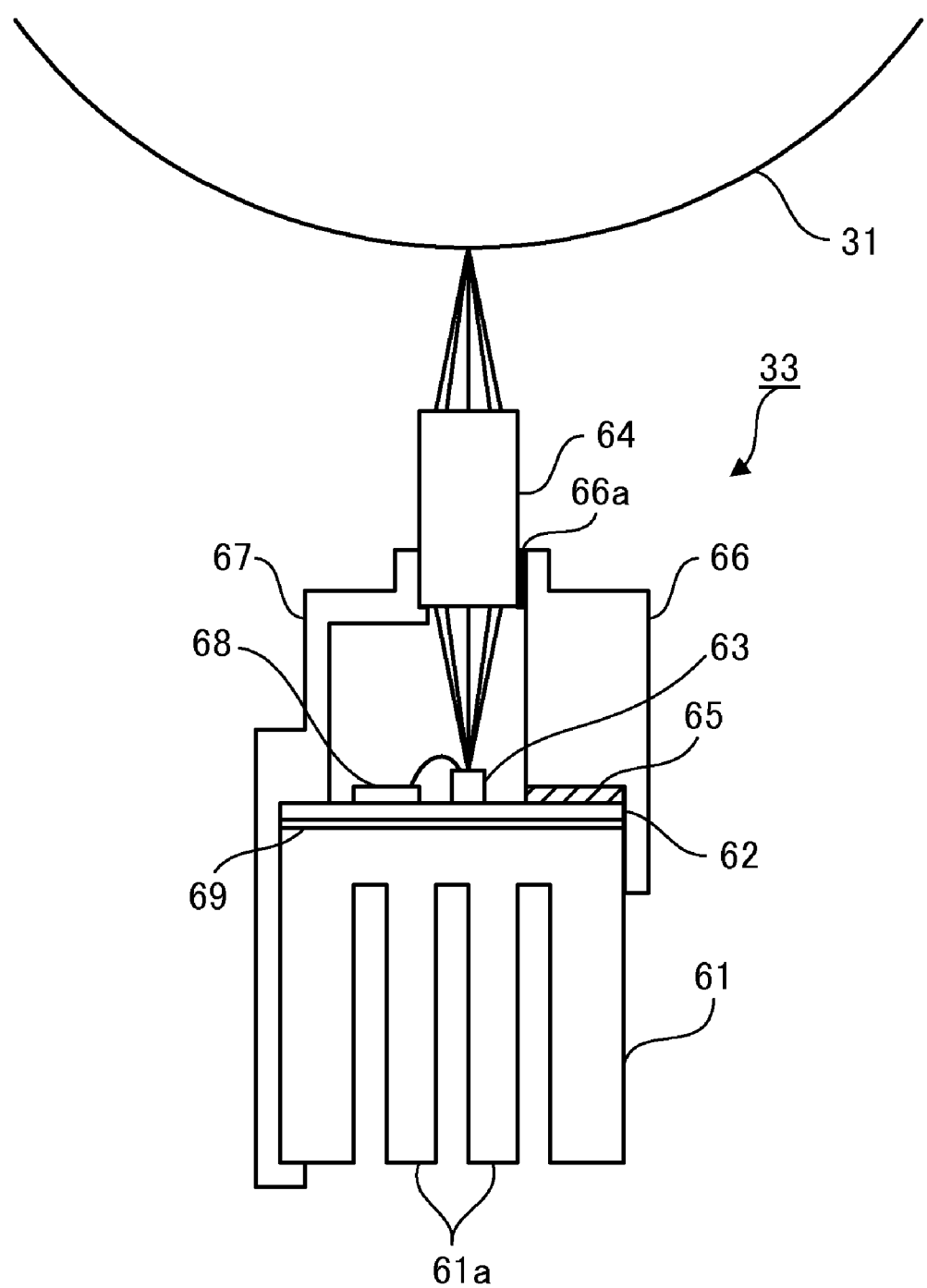
FIG. 3 is a sectional configuration view that shows a configuration of the LED printhead (LPH)

FIG. 3 is a sectional configuration view that shows a configuration of the LED printhead (LPH) 33. In FIG. 3, the LPH 33 is provided with a base 61 serving as an example of a supporting body, a LED array 63 serving as an example of a light emitting element member, a LED circuit substrate 62 that mounts the LED array 63, a drive circuit 68 serving as an example of a drive unit that drives the LED array 63, and the like are installed, a rod lens array 64 that forms an image with light irradiated from the LED array 63 on the surface of the photoconductor drum 31, and a holder 67 that shields the LED array 63 and the like from the exterior while supporting the rod lens array 64.

The LPH 33 is also provided with a sheet shape heater 65 that is arranged so as to be brought in contact with the LED circuit substrate 62 on the front surface side of the LED circuit substrate 62 (the side where the rod lens array 64 is located), serving as an example of a heating unit that heats the LED circuit substrate 62 from the front surface side, a heater holding member 66 that integrally holds the sheet shape heater 65 on the rod lens array 64 side, and a thermal conductive sheet 69 that improves thermal conductive efficiency from the LED circuit substrate 62 to the base 61 between the base 61 and the LED circuit substrate 62.

The LPH 33 is configured movably in the optical axis direction of the rod lens array 64 by an adjusting screw (not shown) and also set so that an image forming position (focal point surface) of the rod lens array 64 is located on the surface of the photoconductor drum 31.

The base 61 is formed by a block or a steel plate made of a metal that has thermal conductivity such as aluminum and SUS. Corresponding to the elongation and retraction of the LED circuit substrate 62 due to heat, the base 61 supports the LED circuit substrate 62 retractility in the longitudinal direction. Meanwhile, in the width direction, the base 61 supports the LED circuit substrate 62 so that a position of the LED circuit substrate 62 is not displaced. In the base 61, plural fins 61a are formed so as to efficiently irradiate heat.

The holder 67 is set so as to support the base 61 and the rod lens array 64 and to keep a predetermined optical positional relationship between the LED array 63 and the rod lens array 64. Further, the holder 67 is arranged so as to seal the LED array 63, the drive circuit 68 and the irradiation surface side of the rod lens array 64 by cooperating with the heater holding member 66, and prevents adhesion of dirt and the like onto the LED array 63, the drive circuit 68 and the irradiation surface of the rod lens array 64 from the exterior.

The heater holding member 66 is formed by the block including the metal that has the thermal conductivity such as the aluminum and the SUS and integrally holds the sheet shape heater 65. The heater holding member 66 is configured detachably from the LPH 33. When the heater holding member 66 is installed in the LPH 33, the heater holding member 66 is arranged so as to seal the LED array 63, the drive circuit 68 and the irradiation surface side of the rod lens array 64 by cooperating with the holder 67. At that time, the heater holding member 66 is configured so as not to be brought in direct contact with the rod lens array 64. That is, at a part of the heater holding member 66 that is opposed to the rod lens array 64, a seal member 66a that has elasticity such as silicone resin is arranged. By filling a gap between the heater holding member 66 and the rod lens array 64, the seal member 66a shields a space where the LED array 63, the drive circuit 68 and the irradiation surface of the rod lens array 64 are arranged from the exterior. Since the seal member 66a has the elasticity, the heater holding member 66 may be moved relatively to the rod lens array 64. Therefore, even in the case where the heater holding member 66 thermally expands due to the heat from the sheet shape heater 65, a change in the position of the rod lens array 64 due to the thermal expansion of the heater holding member 66 is suppressed and a predetermined optical positional relationship between the LED array 63 and the rod lens array 64 is sustained.

Figure 4:
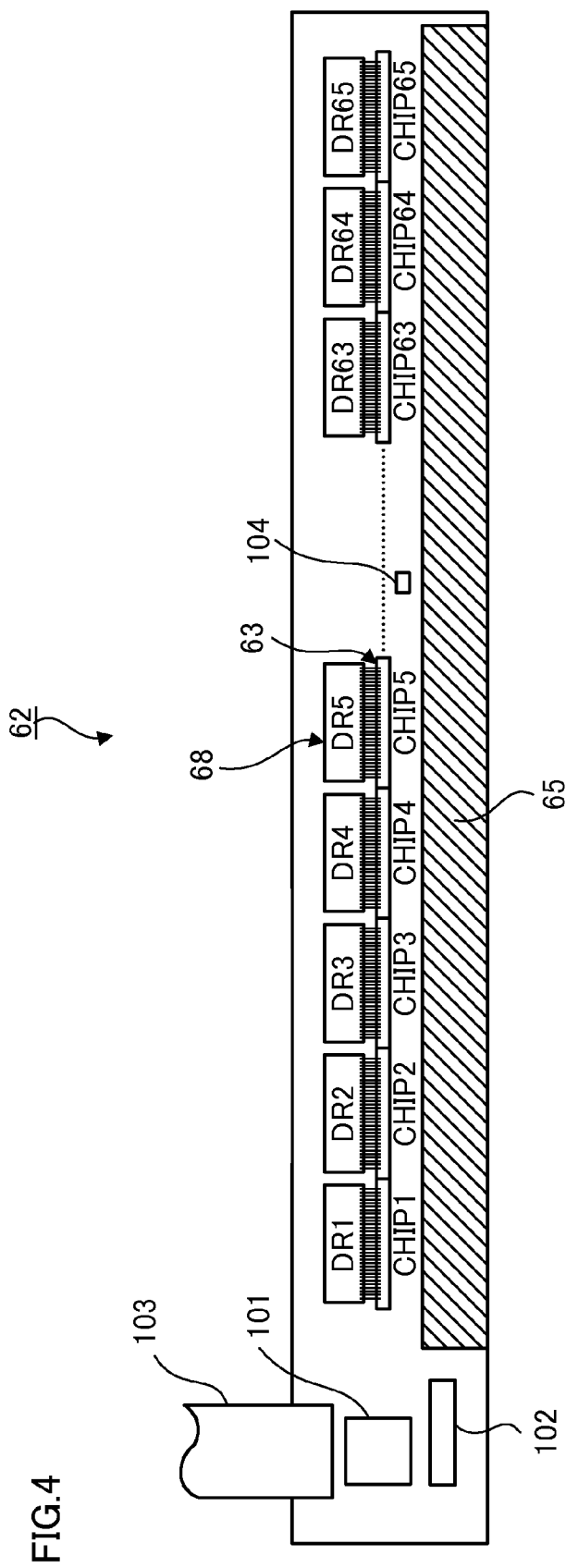
FIG. 4 is a plan view of the surface side of the LED circuit substrate (on the rod lens array side)

Subsequently, a description is given to the LED circuit substrate 62. FIG. 4 is a plan view of the surface side of the LED circuit substrate 62 (on the side where the rod lens array 64 is located).

As shown in FIG. 4, on the surface side of the LED circuit substrate 62, for example the LED array 63 including sixty-five LED chips (CHIP1 to CHIP65) in which three-hundred and eighty-four LED serving as an example of light emitting elements respectively are arranged in an array shape is accurately arranged in a line shape so as to be in parallel to the axial direction of the photoconductor drum 31.

On the one side of arrangement of the LED chips (CHIP1 to CHIP65), the sheet shape heater 65 that heats the LED circuit substrate 62 while contacting the LED circuit substrate 62 from the front surface side, and a temperature sensor 104 that measures a temperature of the LED circuit substrate 62 are arranged. For example, the sheet shape heater 65 has a structure of covering both faces of thin-layer stainless steel that is a heating element with a polyimide and is formed with thickness of approximately 0.15 to 0.2 mm. Along the arrangement direction of the LED chips (CHIP1 to CHIP65), the sheet shape heater 65 is formed with the length in the longitudinal direction that is longer than the length of the arrangement of the LED chips.

On the other side of the arrangement of the LED chips (CHIP1 to CHIP65), the drive circuit 68 including sixty-five driver chips (DR1 to DR65) provided corresponding to the sixty-five LED chips (CHIP1 to CHIP65) respectively is arranged. Each of the driver chips (DR1 to DR65) and corresponding one of the LED chips (CHIP1 to CHIP65) that are driven by each of the driver chips (DR1 to DR65) are connected to each other by bonding wires.

Further, on the front surface side of the LED circuit substrate 62, a three terminal regulator 101 that outputs a predetermined voltage, an EEPROM 102 that stores correction data of a light quantity or the like for every LED, and a harness 103 that sends and receives a signal between the LED circuit substrate 62 and the color image forming controller 70 and supplies electric power and the like.

Next, a description is given to alignment of the image that is formed on each page in the first printer 100A and the second printer 100B according to the first exemplary embodiment. The alignment of the image includes alignment of the color toner images that is performed within each of the printers 100 and alignment of the pages that is performed in the first printer 100A and the second printer 100B so as to align positions of the pages of the images formed on both sides. Further, the alignment of the color toner images that is performed within each of the printers 100 includes alignment in the sub-scanning direction (the transportation direction of the continuous paper P) and alignment in the main scanning direction (the direction that is orthogonal to the sub-scanning direction). In the alignment in the sub-scanning direction of the first exemplary embodiment, timing for starting the exposure of the image in each of the LPHs 33 is adjusted. The alignment in the main scanning direction is performed by controlling the temperature of the LED circuit substrate 62 of each of the LPHs 33 and adjusting the length of the LED circuit substrate 62. The alignment of the color toner images is performed on the basis of the color resist mark (ROC), while the alignment of the pages is performed on the basis of the page resist mark (ROF).

In the printing system 1 according to the first exemplary embodiment, for example, the C-color image forming unit 30C that is located on the most upstream side of the first printer 100A forms the page resist mark (ROF) that is the fiducial of the alignment of the pages in the second printer 100B. Each of the color image forming units 30 of the printers 100 forms the color resist mark (ROC) that is the fiducial of the alignment of the color toner images formed in the image forming units 30. It should be noted that a preprinted paper on which the page resist mark (ROF) is printed in advance may be used. In such a case, the C-color image forming unit 30C does not form the page resist mark (ROF).

Figure 5:
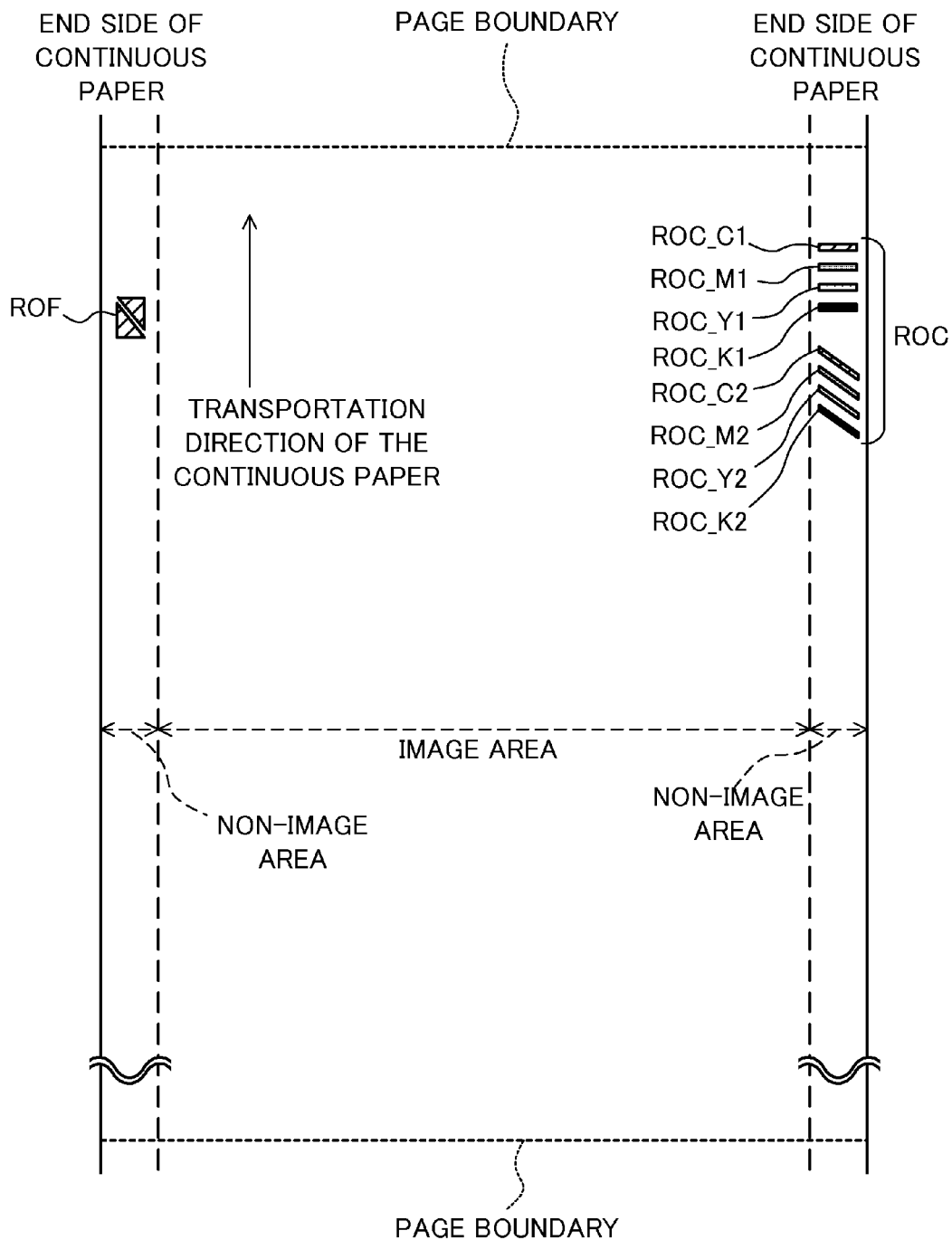
FIG. 5 is a view that shows an example of the page resist mark (ROF) and the color resist marks (ROC) formed on the continuous paper.

FIG. 5 is a view that shows an example of the page resist mark (ROF) and the color resist marks (ROC) formed on the continuous paper P. The page resist mark (ROF) and the color resist marks (ROC) shown in FIG. 5 are formed on non-image areas that are located on the both end sides other than an image area where the image is formed on the continuous paper P for each page. It should be noted that FIG. 5 shows the case where the color resist marks (ROC) are formed on one end side of the non-image areas, however, the color resist marks (ROC) may be formed on both end sides of the non-image areas. In such a case, two color resist mark reading units 39 are provided at two places on the both ends in the main scanning direction.

The alignment of the color toner images for each page that is performed in each of the printers 100 is performed as follows. Firstly, with regard to the alignment in the sub-scanning direction, for example, in the first printer 100A, a color resist mark of C-color (ROC_C1) is formed in the C-color image forming unit 30C, a color resist mark of M-color (ROC_M1) is formed in the M-color image forming unit 30M, a color resist mark of Y-color (ROC_Y1) is formed in the Y-color image forming unit 30Y, and a color resist mark of K-color (ROC_K1) is formed in the K-color image forming unit 30K individually at predetermined timing. The color resist mark reading unit 39 that is arranged in the K-color image forming unit 30K generates a timing signal that shows timing when each of the color resist marks (ROC_C1, ROC_M1, ROC_Y1, ROC_K1) passes through, and sends the signal to the comprehensive controller 50.

On the basis of time differences between the timing signal in the color resist mark of C-color (ROC_C1) and each of the timing signals in corresponding one of the color resist marks of other colors (ROC_M1, ROC_Y1, ROC_K1), the comprehensive controller 50 generates alignment correction data in the sub-scanning direction (the sub-scanning position correction data) at the time of forming the image in the color image forming units 30 other than the C-color image forming unit 30C. The generated sub-scanning position correction data is sent from the comprehensive controller 50 to the image forming controllers 70 of the color image forming units 30 other than the C-color image forming unit 30C, respectively.

On the basis of the sub-scanning position correction data from the comprehensive controller 50 and a page timing signal described later, the color image forming controllers 70 other than the C-color image forming controller 70C set timing for starting the image formation in the sub-scanning direction. Thereby, the alignment of the color toner images that are formed in the first printer 100A in the sub-scanning direction is performed with high accuracy. The same alignment is performed in the second printer 100B.

Meanwhile, with regard to the alignment in the main scanning direction, for example, in the first printer 100A, a color resist mark of C-color (ROC_C2) is formed in the C-color image forming unit 30C, a color resist mark of M-color (ROC_M2) is formed in the M-color image forming unit 30M, a color resist mark of Y-color (ROC_Y2) is formed in the Y-color image forming unit 30Y, and a color resist mark of K-color (ROC_K2) is formed in the K-color image forming unit 30K individually at predetermined timing. The color resist mark reading unit 39 that is arranged in the K-color image forming unit 30K generates reading position data of the color resist marks (ROC_C2, ROC_M2, ROC_Y2, ROC_K2) and sends the data to the comprehensive controller 50. The comprehensive controller 50 generates alignment correction data in the main scanning direction (the main scanning position correction data: hereinafter, also referred to as the "correction amount") at the time of forming the image in each of the color image forming controllers 70 on the basis of the acquired reading position data. The generated main scanning position correction data is sent from the comprehensive controller 50 to each of the image forming controllers 70 of corresponding one of the color image forming units 30. On the basis of the main scanning position correction data, the temperature of the LED circuit substrate 62 of the LPH 33 described later is controlled so as to adjust the length of the LED circuit substrate 62. Thereby, the alignment of the color toner images that are formed in the first printer 100A in the main scanning direction (hereinafter, referred to as the "print width correction") is performed with high accuracy. The same alignment is performed in the second printer 100B.

The alignment of the pages between the image that is formed in the first printer 100A and the image that is formed in the second printer 100B is performed as follows. As mentioned above, the C-color image forming unit 30C that is located on the most upstream side of the first printer 100A forms the page resist mark (ROF) for each page of the continuous paper P (refer to FIG. 5). The page resist mark reading unit 38 that is arranged in the C-color image forming unit 30C of the second printer 100B reads the page resist mark (ROF) on each page, and generates the page timing signal that shows the timing when the page resist mark (ROF) passes through the page resist mark reading unit 38. The generated page timing signal is sent to the comprehensive controller 50. The comprehensive controller 50 sends the page timing signal to each of the image forming controllers 70 of corresponding one of the color image forming units 30.

The C-color image forming controller 70C of the second printer 100B sets image forming timing in the C-color image forming unit 30C on the basis of the acquired page timing signal. Then, on the basis of the set image forming timing, the C-color image forming controller 70C starts the exposure with the LPH 33.

On the basis of the acquired page timing signal and the sub-scanning position correction data mentioned above, each of the image forming controllers 70 of corresponding one of the color image forming units 30 other than the C-color image forming unit 30C sets image forming start timing and starts the exposure with the LPH 33.

As mentioned above, the second printer 100B according to the first exemplary embodiment, is configured so that the image forming timing in each of the color image forming units 30 is set on the basis of the timing when the page resist mark (ROF) that is formed on the continuous paper P passes through the page resist mark reading unit 38 of the C-color image forming unit 30C. That is, in the printing system 1 according to the first exemplary embodiment, since the exposure start timing of each of the color image forming units 30 is set on the basis of the position of the page resist mark (ROF) on the continuous paper P, the alignment of the pages with the image that is formed on the front surface in the first printer 100A and the image that is formed on the back surface in the second printer 100B is performed with high accuracy.

Subsequently, a description is given to the alignment of the color toner images in the main scanning direction (the print width correction) in the printers 100 according to the first exemplary embodiment.

As mentioned above, the print width correction is performed by controlling the temperature of the LED circuit substrate 62 of the LPH 33 that is arranged in each of the color image forming units 30 and adjusting the length of the LED circuit substrate 62.

With regard to each LED array 63 that is arranged on the LED circuit substrate 62, an arrangement position thereof varies at the time of manufacturing. Therefore, among the color image forming units 30, original displacement in the arrangement position of the LED is generated. Although each of the LEDs that configures the LED array 63 is a light emitting element with a relatively small heat quantity, for example, the number of the LEDs is about 25,000 in the case where the LEDs are arranged in the LPH 33 that has the overall length of 530 mm with a resolution of 1,200 dpi (dot per inch). Therefore, a large heat quantity to the extent that expands the LED circuit substrate 62 is generated. Thereby, the displacement in the arrangement position of the LED on the LED circuit substrate 62 is also generated.

Meanwhile, a thermal expansion rate of a print substrate that forms the LED circuit substrate 62 is, for example approximately 10 μm/degree C. in case of the LPH 33 having the overall length of 530 mm. Therefore, in the LPH 33 having the overall length of 530 mm with the resolution of 1,200 dpi, for example, when the temperature is changed by 10 degrees C., the overall length may be changed by approximately 100 μm. Thereby, when temperature amplitude is set to, for example, approximately 10 degrees C., the arrangement position of the LED may be adjusted by approximately 100 μm.

Then, in the printer 100 according to the first exemplary embodiment, the temperature of the LED circuit substrate 62 of the LPH 33 that is arranged in each of the color image forming units 30 is controlled to the temperature amplitude of approximately 10 degrees C. so as to adjust a thermal expansion amount of the LED circuit substrate 62. Therefore, the print width correction is performed by controlling a displacement amount of the LEDs on the LED circuit substrate 62 of the LPH 33 that is arranged in the color image forming unit 30 so that the displacement amount is substantially the same among the color image forming units 30, and the displacement of the image among the color image forming units 30 is reduced. Consequently, generation of color drift is suppressed.

For example, provided that an allowable amount of the displacement of each of the color toner images on an image is 150 μm. In such a case, if the temperature amplitude of the LED circuit substrate 62 is approximately 10 degrees C., the arrangement position of the LED may be adjusted by approximately 100 μm. Therefore, when the variations in the arrangement position of the LED array 63 of the LPH 33 that is arranged in each of the color image forming units 30 at the time of manufacturing are suppressed within a realizable range of +/−125 μm (that is, a difference between the upper limit and the lower limit is 250 μm), the allowable amount of the displacement of 150 μm may be satisfied.

Here, in the LPH 33 according to the first exemplary embodiment, the sheet shape heater 65 that supplies the heat to the LED circuit substrate 62 is arranged so as to heat the LED circuit substrate 62 while contacting with the LED circuit substrate 62 from the front surface side. Meanwhile, the back surface side of the LED circuit substrate 62 is arranged so as to be brought into contact with the base 61 that has the thermal conductivity through the thermal conductive sheet 69.

As mentioned above, the sheet shape heater 65 heats the LED circuit substrate 62 so as to adjust the temperature of the LED circuit substrate 62 within a range of the temperature amplitude of approximately 10 degrees C., and the print width correction is performed. Meanwhile, from the LED array 63 that includes the LED chips (CHIP1 to CHIP65) and the drive circuit 68 that includes the driver chips (DR1 to DR65) provided on one side of the arrangement of the LED array 63, the heat is also generated at the time of driving the LEDs. The heat that is generated from the LED chips and the driver chips changes the light quantity of the light that is irradiated from the LED chips, and unstabilizes a signal processing in the driver chips. Therefore, in the configuration in which the sheet shape heater 65 heats the LED circuit substrate 62, a temperature of the LED chips and the driver chips is excessively increased so that an unstable light quantity and malfunction in the driver chips may be easily generated.

In addition, in the case where a lighting rate of the LEDs is differentiated depending on the image area, there is sometimes a case where a temperature distribution is generated due to a difference in the heat quantity generated in the longitudinal direction of the LED circuit substrate 62. In such a case, when the LED circuit substrate 62 is heated by the sheet shape heater 65, a uniform temperature distribution is not formed in the longitudinal direction of the LED circuit substrate 62, and there is sometimes a case where a deformation or a warp is generated in the LED circuit substrate 62.

Therefore, it is necessary to efficiently release the heat generated from the LED chips (CHIP1 to CHIP65) and the driver chips (DR1 to DR65) from the LED circuit substrate 62.

Figure 6:
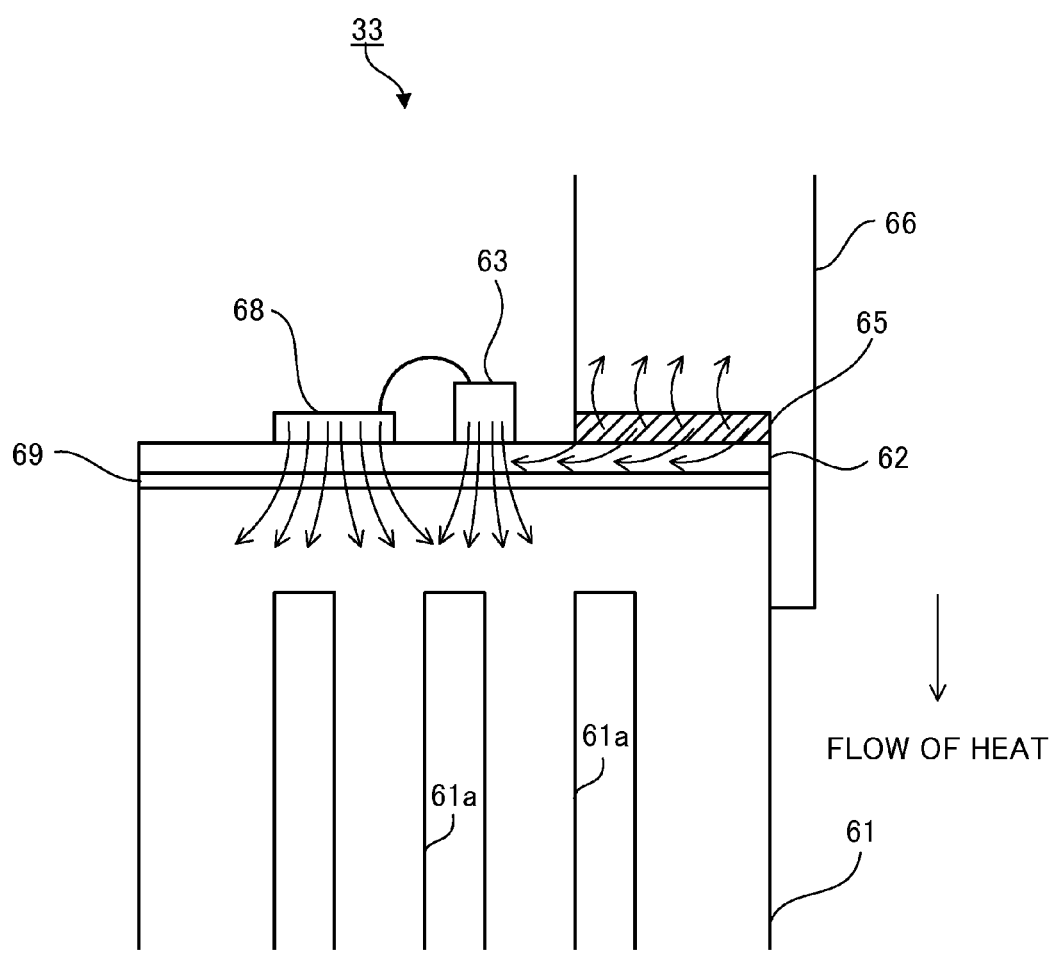
FIG. 6 is a view that shows flow of the heat in the LED circuit substrate.

Then, in the LPH 33 according to the first exemplary embodiment, the sheet shape heater 65 that supplies the heat to the LED circuit substrate 62 is arranged on the front surface side of the LED circuit substrate 62, while the back surface side of the LED circuit substrate 62 is arranged so as to be brought into contact with the base 61 that has the thermal conductivity through the thermal conductive sheet 69. Thereby, as shown in FIG. 6 (a view that shows flow of the heat in the LED circuit substrate 62), the heat that is generated from the LED chips and the driver chips efficiently flows to the base 61 having a large thermal capacity so as to suppress an excessive increase in the temperature of the LED chips and the driver chips. Consequently, the unstable light quantity of the LED chips and the malfunction of the driver chips are suppressed. Further, the LED circuit substrate 62 is heated by the sheet shape heater 65 in a state of high uniformity in the longitudinal direction. Thereby, the deformation and the warp are suppressed in the LED circuit substrate 62.

Furthermore, the sheet shape heater 65 is arranged on the side portion opposite to the portion where the driver chips (DR1 to DR65) is arranged, across the LED chips (CHIP1 to CHIP65). Therefore, an influence of the heat from the sheet shape heater 65 to the driver chips is reduced, and hence the excessive increase in the temperature of the driver chips is also suppressed.

As shown in FIG. 6, the sheet shape heater 65 that heats the LED circuit substrate 62 is integrally held by the heater holding member 66 from the rod lens array 64 side (on the opposite side of the LED circuit substrate 62). The heater holding member 66 is formed by the metal that has the thermal conductivity such as the aluminum and the SUS as mentioned above and is configured so that a part of the heat that is generated from the sheet shape heater 65 flows in.

Thereby, the heater holding member 66 also functions as a heat flowing-in unit. Since the heat generated from the sheet shape heater 65 also flows into the heater holding member 66, a radical increase in the temperature of the LED circuit substrate 62 is suppressed. Therefore, a state where the temperature of the LED circuit substrate 62 is overshot exceeding a predetermined range is suppressed. Consequently, a state where a radical thermal expansion is generated in the LED circuit substrate 62 and the arrangement position of the LEDs on the LED circuit substrate 62 is changed for a short time is suppressed. Thereby, in the LPH 33 according to the first exemplary embodiment, a state where the alignment of the color toner images in the main scanning direction is temporarily uncontrollable is suppressed, so that the print width correction is stably performed.

Figure 7:
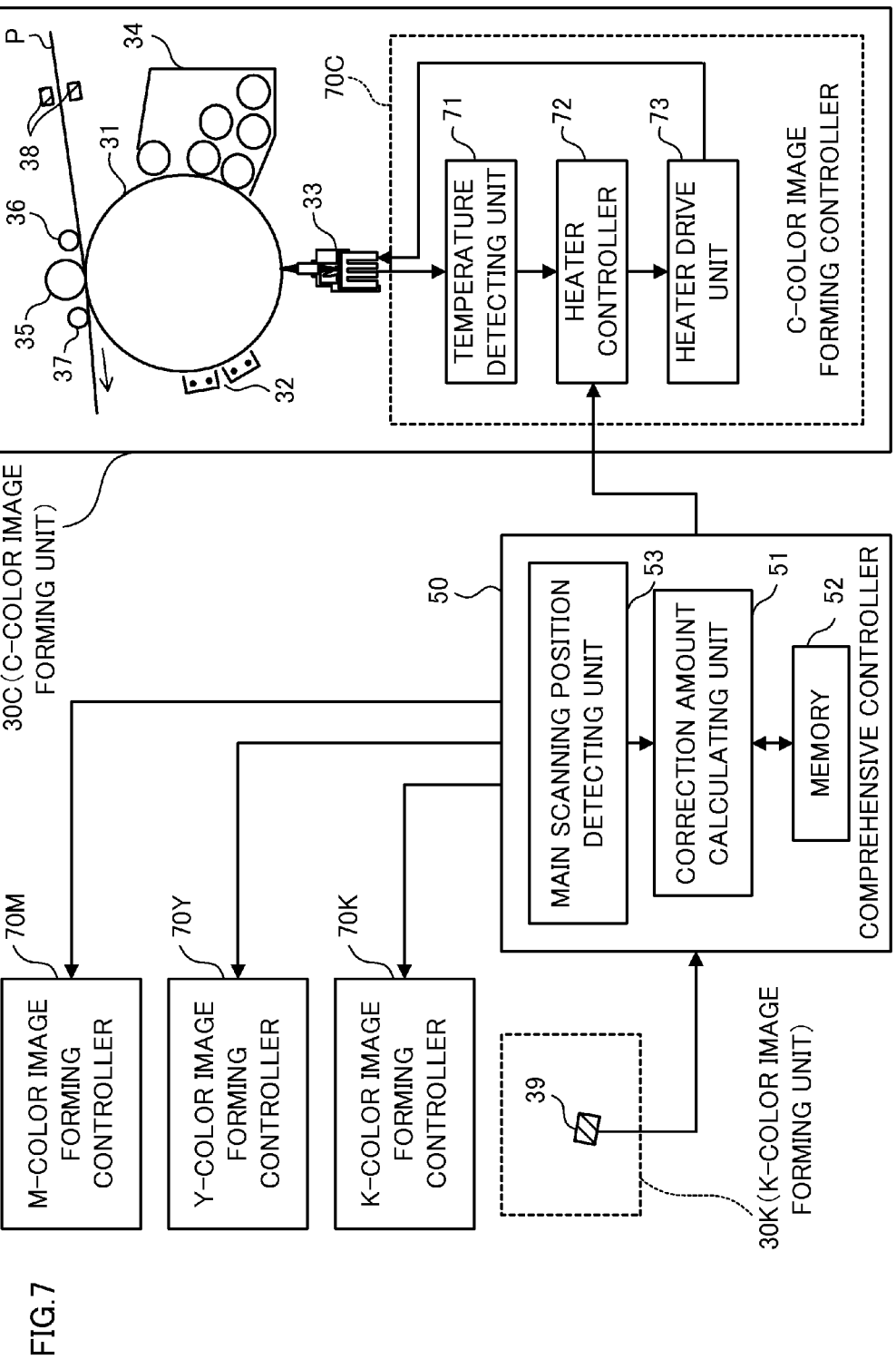
FIG. 7 is a view that explains a function configuring unit that performs the print width correction in the printers according to the first exemplary embodiment.

Next, FIG. 7 is a view that explains a function configuring unit that performs the print width correction in the printers 100 according to the first exemplary embodiment. As shown in FIG. 7, the print width correction is performed under the control of the color image forming controllers 70 and the comprehensive controller 50. It should be noted that, although FIG. 7 specifically shows only the function configuring unit that performs the print width correction within the C-color image forming unit 30C, the same correction is performed in each of the color image forming units 30 other than the C-color image forming unit 30C.

As the function configuring unit that performs the print width correction, the color image forming units 30 are respectively provided with a temperature detecting unit 71, a heater controller 72 and a heater drive unit 73. The comprehensive controller 50 is provided with a correction amount calculating unit 51, a memory 52 and a main scanning position detecting unit 53.

It should be noted that a CPU (not shown in the figure) of each of the color image forming controllers 70 reads a program that executes functions of the temperature detecting unit 71, the heater controller 72 and the heater drive unit 73 from a main memory (not shown in the figure) into a RAM or the like within each of the color image forming controllers 70 to perform various processing. A CPU (not shown in the figure) of the comprehensive controller 50 reads a program that executes functions of the correction amount calculating unit 51 and the main scanning position detecting unit 53 from a main memory (not shown in the figure) into a RAM or the like within the comprehensive controller 50 to perform various processing.

In the comprehensive controller 50, the main scanning position detecting unit 53 acquires the reading position data of each of the color resist marks (ROC_C2, ROC_M2, ROC_Y2, ROC_K2) from the color resist mark reading unit 39. The main scanning position detecting unit 53 generates main scanning position data with regard to the color resist marks (ROC_C2, ROC_M2, ROC_Y2, and ROC_K2). Then, the main scanning position detecting unit 53 sends the generated main scanning position data to the correction amount calculating unit 51.

The memory 52 of the comprehensive controller 50 stores an initial displacement amount of the LEDs in the main scanning direction for each of the LPHs 33 that is installed in corresponding one of the color image forming units 30. The initial displacement amount here is an amount that is measured in advance at a predetermined temperature (for example, 20 degrees C.) as, for example, the displacement amount of the LEDs to a designed amount at the time of manufacturing. At the time of manufacturing the printer 100, the memory 52 stores the initial displacement amount of each of the LPHs 33 that is installed in corresponding one of the color image forming units 30 as, for example, 4-bit data.

On the basis of the initial displacement amount of each of the LPHs 33 that is stored in the memory 52, the correction amount calculating unit 51 extracts, for example, the LPH 33 with the largest initial displacement amount among the LPHs 33 of the color image forming units 30. Further, the LPH 33 with the largest initial displacement amount is set as a reference LPH 33. On the basis of the main scanning position data concerning the above reference LPH 33 from the main scanning position detecting unit 53, the correction amount in the LPHs 33 of the image forming units 30 other than the reference LPH 33 is calculated. That is, taking the main scanning position data of the reference LPH 33 as the reference, a difference from the main scanning position data at the LPHs 33 of other color image forming units 30 is calculated as the correction amount. The calculated correction amount is sent to the heater controller 72 of the color image forming controller 70. The calculated correction amount here is an adjusted amount of the length of the LED circuit substrate 62 that is to match the position of the LEDs of each of LPHs 33 in corresponding one of the color image forming units 30 to the position of LEDs of the reference LPH 33.

Meanwhile, in each of the color image forming controllers 70, the temperature detecting unit 71 acquires a measured temperature value from the temperature sensor 104 on the LED circuit substrate 62. Thereby, the temperature of the LED circuit substrate 62 is detected and sent to the heater controller 72 as temperature data.

On the basis of the temperature data that is acquired from the temperature detecting unit 71 and the correction amount that is calculated in the correction amount calculating unit 51 of the comprehensive controller 50, the heater controller 72 sets a supplying amount of electric power to the sheet shape heater 65 that is arranged on the LED circuit substrate 62.

That is, the heater controller 72 stores a correspondence relationship between a substrate temperature in the LPH 33 and a position changing amount of the LED in, for example, a ROM (not shown in the figure) or the like serving as an example of a memory, as a table. For example, from a size of the LED circuit substrate 62 in the longitudinal direction and the thermal expansion rate of a material that constitutes the LED circuit substrate 62, the correspondence relationship between the substrate temperature of the LPH 33 and the position changing amount of the LED is determined. With using the table, a target temperature value is set from the temperature data and the correction amount, and the supplying amount of electric power to the sheet shape heater 65 that adjusts the temperature of the LED circuit substrate 62 to the set target temperature value is set. The heater drive unit 73 supplies the electric power that is set in the heater controller 72 to the sheet shape heater 65.

Thereby, the length of the LED circuit substrates 62 in the LPHs 33 of the image forming units 30 other than the reference LPH 33 is adjusted, and the alignment of the color toner images in the main scanning direction (the print width correction) is performed.

Figure 8:
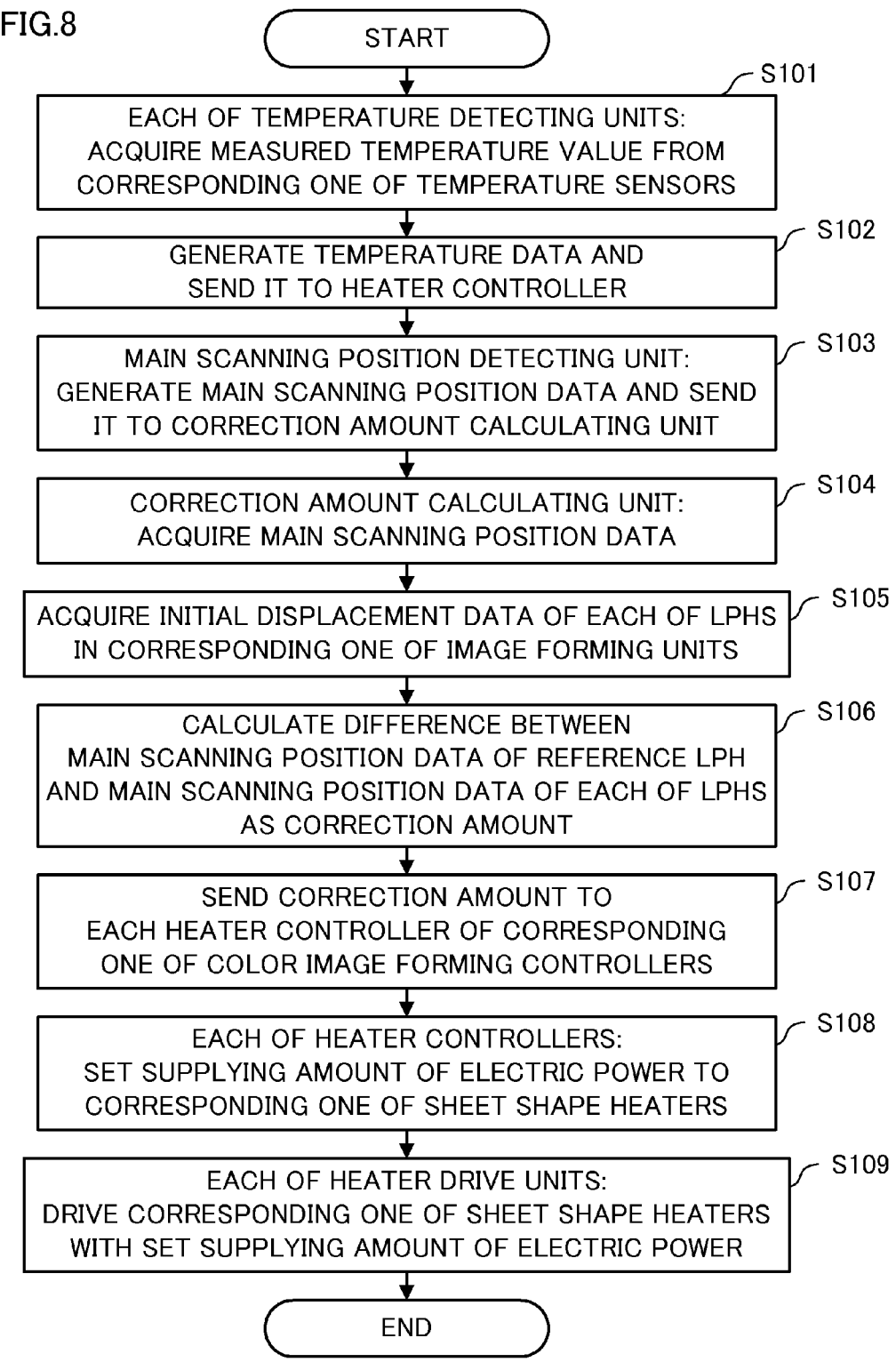
FIG. 8 is a flowchart that shows an example of the procedure of performing the print width correction.

Subsequently, a description is given to a procedure of performing the print width correction in the printers 100 according to the first exemplary embodiment. FIG. 8 is a flowchart that shows an example of the procedure of performing the print width correction. The procedure is, as mentioned above, performed under the control of the color image forming controllers 70 and the comprehensive controller 50.

As shown in FIG. 8, firstly, the temperature detecting unit 71 acquires the measured temperature value from the temperature sensor 104 (S101). The temperature data of the LED circuit substrate 62 is generated from the acquired measured temperature value and sent to the heater controller 72 (S102).

The main scanning position detecting unit 53 of the comprehensive controller 50 generates the main scanning position data on the basis of the reading position data of each of the color resist marks (ROC_C2, ROC_M2, ROC_Y2, ROC_K2) that is acquired from the color resist mark reading unit 39, and sends the main scanning position data to the correction amount calculating unit 51 (S103).

The correction amount calculating unit 51 acquires the main scanning position data from the main scanning position detecting unit 53 (S104). The initial displacement amount data of each of the LPHs 33 in corresponding one of the color image forming units 30 is acquired from the memory 52 (S105). The LPH 33 with the largest initial displacement amount among the LPHs 33 of the color image forming units 30 is set as the reference LPH 33, and the difference between the main scanning position data of the reference LPH 33 and the main scanning position data of each of the LPHs 33 in corresponding one of other color image forming units 30 other than the color image forming unit 30 of the LPH 33 with the largest initial displacement amount is calculated as the correction amount (S106). The correction amount calculating unit 51 sends the calculated correction amount in each of the LPHs 33 to the heater controller 72 of the color image forming controllers 70 (S107).

On the basis of the temperature data that is acquired from the temperature detecting unit 71 and the correction amount data that is acquired from the comprehensive controller 50, the heater controller 72 sets the supplying amount of electric power to the sheet shape heater 65 (S108). That is, on the basis of the acquired temperature data of the LED circuit substrate 62 and the correction amount data that is acquired from the comprehensive controller 50, the target temperature value of the LED circuit substrate 62 is set so that the position of the LEDs on the LED circuit substrate 62 substantially matches the position of the LEDs on the LED circuit substrate 62 of the reference LPH 33. Then, the supplying amount of electric power to the sheet shape heater 65 that adjusts the temperature of the LED circuit substrate 62 to the set target temperature value is set.

The heater controller 72 sends the set supplying amount of electric power to the sheet shape heater 65 to the heater drive unit 73. The heater drive unit 73 drives the sheet shape heater 65 with the set supplying amount of electric power (S109).

In the LPH 33 according to the first exemplary embodiment, the displacement amount of the LED on the LED circuit substrate 62 of the LPH 33 that is arranged in each of the color image forming units 30 is controlled to be substantially the same so as to perform the print width correction and reduce the displacement of the image among the color image forming units 30. Thereby, the generation of the color drift is suppressed.

Figure 9:
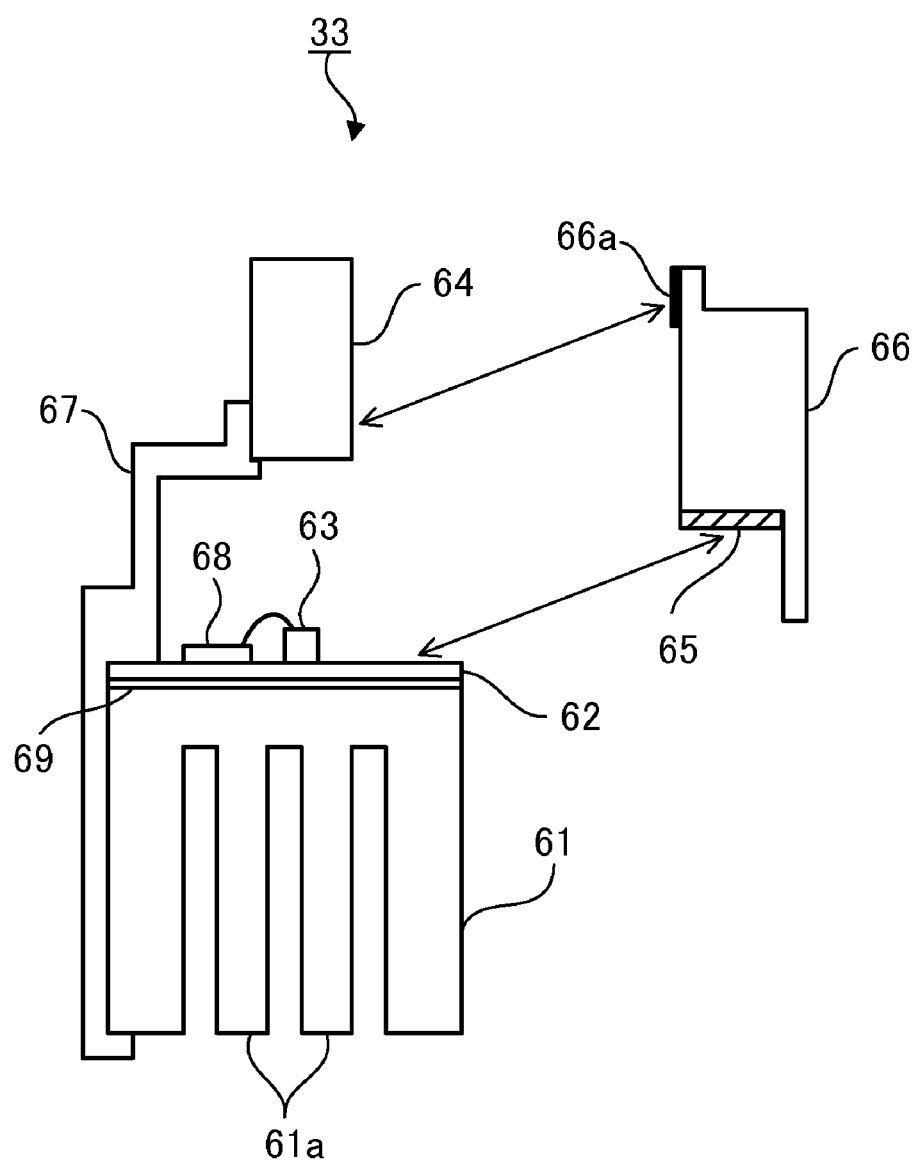
FIG. 9 is a view that shows a state where the heater holding member is attached to and detached from the LPH.

As mentioned above, in the LPH 33 according to the first exemplary embodiment, the heater holding member 66 is configured detachably from the LPH 33. Specifically, the heater holding member 66 is configured detachably from the base 61 serving as the supporting body of the LPH 33. FIG. 9 is a view that shows a state where the heater holding member 66 is attached to and detached from the LPH 33. As shown in FIG. 9, in the LPH 33 according to the first exemplary embodiment, since the heater holding member 66 is configured detachably from the LPH 33, the sheet shape heater 65 corresponding to, for example, a heat generating characteristic of the LPH 33, a temperature characteristic of the printers 100 in which the LPHs 33 are installed and the like may be selected. Thereby, the generation of the color drift is reduced by the print width correction with high accuracy. Since a configuration of a main body of the LPH 33 becomes common, a developing efficiency of the LPH 33 is improved.

Here, when the heater holding member 66 is attached to the LPH 33, in order to improve a heat conduction performance from the sheet shape heater 65 to the LED circuit substrate 62, a heat conductive sheet is preferably arranged on a surface where the sheet shape heater 65 is brought into contact with the LED circuit substrate 62.

Since the heater holding member 66 is easily removed from the LPH 33, manufacturing cost of the LPH 33 is reduced.

As mentioned above, in the print width correction in the printers 100 according to the first exemplary embodiment, for example, as shown in the flowchart of FIG. 8, the reference LPH 33 is set among the LPHs 33 of the respective color image forming units 30, and the difference between the main scanning position data of the reference LPH 33 and the main scanning position data of each of the LPHs 33 in corresponding one of other color image forming units 30 is calculated as the correction amount. With using the calculated correction amount, the length of the LED circuit substrate 62 in each of LPHs 33 in corresponding one of the image forming units 30 other than the reference LPH 33 is adjusted, and the alignment of the color toner images in the main scanning direction (the print width correction) is performed.

Therefore, since there is no need for performing the print width correction in the reference LPH 33, there is no need for arranging the sheet shape heater 65 in the reference LPH 33. In the case where the print width correction is performed by the flowchart of the FIG. 8 mentioned above, the reference LPH 33 that is used when the correction amount is calculated at step 106 is selected in advance. With regard to the reference LPH 33, the heater holding member 66 that integrally holds the sheet shape heater 65 is removed from the LPH 33 in advance. The reference LPH 33 in the flowchart of the FIG. 8 is the LPH 33 with the largest initial displacement amount among the LPHs 33 of the color image forming units 30. Therefore, the LPH 33 with the largest initial displacement amount is used while removing the heater holding member 66. Thereby, the LPH 33 is used while the configuration of the main body of the LPH 33 becomes common, and the manufacturing cost is reduced by removing the sheet shape heater 65 from the LPH 33 that does not require performing the print width correction.

For example, as the reference LPH 33, the LPH 33 that is installed in a predetermined color image forming unit 30 such as the LPH 33 that is installed in the K-color image forming unit 30K may be set in advance. At that time, on the basis of the main scanning position data with regard to the LPH 33 that is installed in the K-color image forming unit 30K, the correction amount of each of the LPHs 33 in corresponding one of the image forming units 30 other than the reference LPH 33 is calculated. In such a case, since the print width correction is not performed in the K-color image forming unit 30K, the LPH 33 where the heater holding member 66 integrally holding the sheet shape heater 65 is removed in advance is used. Thereby, the manufacturing cost is also reduced by removing the sheet shape heater 65 from the LPH 33 that does not require performing the print width correction.

In addition, in the printers 100 according to the first exemplary embodiment, the configuration where the four color image forming units 30 are arranged is adopted. However, for a user who needs only a black and white image, the printers 100, each of which is configured by only the K-color image forming unit 30K, may be provided. In such a case, although there is also no need for performing the print width correction in the K-color image forming unit 30K. However, with regard to the LPH 33 according to the first exemplary embodiment in which the heater holding member 66 is detachably configured, the LPH 33 in which the heater holding member 66 is not arranged may be manufactured at a low cost.

As mentioned above, in the LPH 33 according to the first exemplary embodiment, the heater holding member 66 that integrally holds the sheet shape heater 65 is configured detachably from the LPH 33. Thereby, the sheet shape heater 65 corresponding to, for example, the heat generating characteristic or the like of the LPH 33 and the printer 100 may be selected. Therefore, in the LEDs among the respective LPHs 33, the alignment is stably performed with high accuracy, and hence the generation of the color drift in the formed image is suppressed. Since the configuration of the main body of the LPH 33 becomes common, the developing efficiency of the LPH 33 is improved. Further, the manufacturing cost is reduced by removing the sheet shape heater 65 from the LPH 33 that does not require performing the print width correction.

Second Exemplary Embodiment

In the LPH 33 according to the first exemplary embodiment, the description is given to the case where the heater holding member 66 that integrally holds the sheet shape heater 65 arranged so as to be brought in contact with the LED circuit substrate 62 is configured detachably from the LPH 33. In the LPH 33 according to the second exemplary embodiment, a description is given to the case where the heater holding member 66 that integrally holds the sheet shape heater 65 arranged so as not to be brought into direct contact with the LED circuit substrate 62 is configured detachably from the LPH 33. It should be noted that the same reference numerals are used for the same configuration as in the first exemplary embodiment, and a detailed explanation thereof is omitted.

Figure 10:
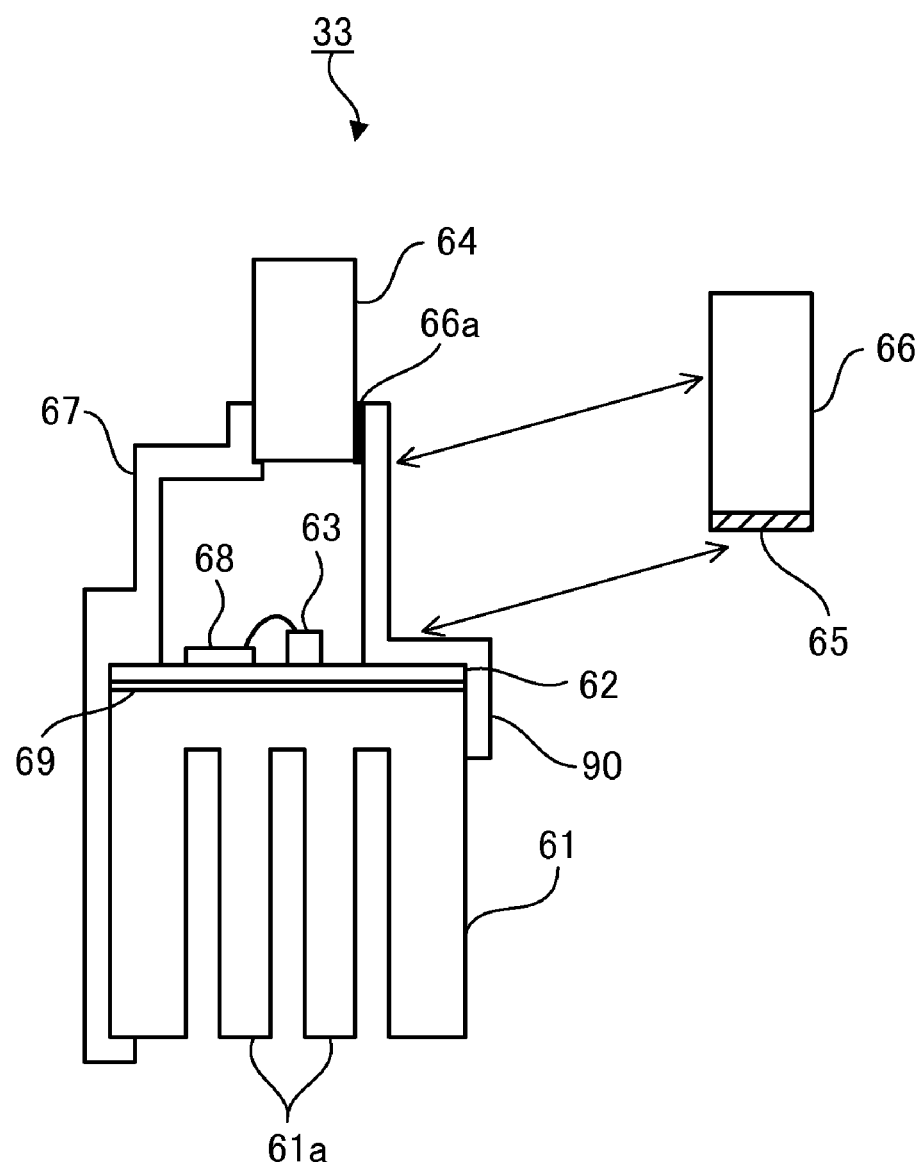
FIG. 10 is a view that shows a state where, in the LED printhead (LPH) according to the second exemplary embodiment, the heater holding member is attached to and detached from the LPH.

FIG. 10 is a view that shows a state where, in the LED printhead (LPH) 33 according to the second exemplary embodiment, the heater holding member 66 is attached to and detached from the LPH 33. The LPH 33 according to the second exemplary embodiment is, as shown in FIG. 10, in addition to the holder 67, provided with a shielding member 90 that is arranged so as to seal the LED array 63, the drive circuit 68 and the irradiation surface side of the rod lens array 64 by cooperating with the holder 67. The heater holding member 66 that integrally holds the sheet shape heater 65 is attached to and detached from a part where the shielding member 90 is arranged in the LPH 33.

In the LPH 33 according to the second exemplary embodiment, the LED array 63, the drive circuit 68 and the irradiation surface side of the rod lens array 64 are always set in a sealed state by the holder 67 and the shielding member 90. Therefore, at the time of attaching and detaching the heater holding member 66, the adhesion of the dirt and the like onto the LED array 63, the drive circuit 68 and the irradiation surface of the rod lens array 64 is suppressed.

At a part of the shielding member 90 that is opposed to the rod lens array 64, a seal member 66a that has elasticity such as silicone resin is arranged. By filling a gap between the shielding member 90 and the rod lens array 64, the seal member 66a shields a space where the LED array 63, the drive circuit 68 and the irradiation surface of the rod lens array 64 are arranged from the exterior. Since the seal member 66a has the elasticity, the shielding member 90 may be moved relatively to the rod lens array 64. Therefore, even in the case where the shielding member 90 thermally expands due to the heat from the sheet shape heater 65 through the heater holding member 66, a change in the position of the rod lens array 64 due to the thermal expansion of the shielding member 90 is suppressed. Thereby, a predetermined optical positional relationship between the LED array 63 and the rod lens array 64 is sustained.

In the LPH 33 according to the second exemplary embodiment, the sheet shape heater 65 corresponding to, for example, the heat generating characteristic or the like of the LPH 33 and the printer 100 may be selected. Therefore, in the LEDs among the respective LPHs 33, the alignment is stably performed with high accuracy, and hence the generation of the color drift in the formed image is suppressed. Since the configuration of the main body of the LPH 33 becomes common, the developing efficiency of the LPH 33 is improved. Further, the manufacturing cost is reduced by removing the sheet shape heater 65 from the LPH 33 that does not require performing the print width correction.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
 a plurality of image carriers; and
 a plurality of exposure apparatuses that are arranged corresponding to the plurality of image carriers respectively, the plurality of exposure apparatuses each having a light emitting element member that exposes the respective image carrier and is arranged on a substrate,
 wherein a predetermined exposure apparatus among the plurality of exposure apparatuses includes a heating unit that heats the substrate, and
 wherein another exposure apparatus among the plurality of exposure apparatuses does not include a heating unit.

2. The image forming apparatus according to claim 1, wherein the predetermined exposure apparatus further comprises a heat flowing unit that receives an inflow of heat generated by the heating unit.

3. The image forming apparatus according to claim 1, wherein the heating unit heats a surface of the substrate of the predetermined exposure apparatus on which the light emitting element member is arranged.

4. The image forming apparatus according to claim 1, wherein:
 the predetermined exposure apparatus further comprises a shielding unit that shields the light emitting element member from the exterior,
 the heating unit is installed in the exterior,
 the heating unit heats the substrate through the shielding unit,
 the shielding unit receives an inflow of heat generated from the heating unit and integrally holds the heating unit,
 the substrate is supported by a supporting body, and
 the heating unit is attached to and detached from the supporting body integrally with the shielding unit.

5. The image forming apparatus according to claim 1, wherein, in the plurality of exposure apparatuses, the substrate is supported by a supporting body that receives an inflow of heat from the substrate.

6. An exposure apparatus comprising:
 a supporting body;
 a substrate that is supported by the supporting body;
 a plurality of light emitting elements that are arranged on the substrate in a line;
 a heating unit that heats the substrate, the heating unit being configured so as to be detachable from the supporting body; and
 a holding member that receives an inflow of heat generated from the heating unit and integrally holds the heating unit, wherein
 the heating unit is attached to and detached from the supporting body integrally with the holding member.

7. The exposure apparatus according to claim 6, wherein the holding member is installed on the supporting body in a state where the holding member is not brought into direct contact with an optical member arranged on an optical path of light irradiated from the light emitting elements.

8. The exposure apparatus according to claim 6, wherein the heating unit heats a surface of the substrate on which the light emitting elements are arranged.

9. The exposure apparatus according to claim 6, further comprising a shielding unit that shields the light emitting elements from the exterior,
wherein the heating unit is supported in the exterior, and
wherein the heating unit heats the substrate through the shielding unit.

10. An image forming method in an image forming apparatus, the image forming apparatus including:
a plurality of image carriers; and
a plurality of exposure apparatuses that are arranged corresponding to the plurality of image carriers respectively, the plurality of exposure apparatuses each having a light emitting element member that exposes the respective image carrier and is arranged on a substrate,
wherein a predetermined exposure apparatus among the plurality of exposure apparatuses includes a heating unit that heats the substrate, and
wherein another exposure apparatus among the plurality of exposure apparatuses does not include a heating unit,
the image forming method comprising:
heating the substrate of the predetermined exposure apparatus among the plurality of exposure apparatuses, and
forming an image using the image forming apparatus.

11. The image forming method according to claim 10, wherein the heating step further comprises:
acquiring a temperature of the plurality of exposure apparatuses,
acquiring an initial displacement of the plurality of exposure apparatuses,
calculating a correction amount, and
heating the substrate of the predetermined exposure apparatus among the plurality of exposure apparatuses based off of the calculated correction amount.

* * * * *